(12) United States Patent
Henmi et al.

(10) Patent No.: US 8,568,687 B2
(45) Date of Patent: Oct. 29, 2013

(54) METHOD OF MANUFACTURING SOLID ACID CATALYST

(76) Inventors: Teruo Henmi, Ehime-ken (JP); Toru Tonegawa, Tokyo (JP); Toshiaki Ubukata, Tochigi-ken (JP); Hirokuni Matsuda, Kanagawa-ken (JP); Shuji Tada, Saitama-ken (JP)

( * ) Notice: Subject to any disclaimer, the term of this patent is extended or adjusted under 35 U.S.C. 154(b) by 610 days.

(21) Appl. No.: 11/475,369

(22) Filed: Jun. 27, 2006

(65) Prior Publication Data

US 2007/0297974 A1     Dec. 27, 2007

(51) Int. Cl.
*C01B 39/02*     (2006.01)

(52) U.S. Cl.
USPC ........... 423/703; 423/710; 423/714; 423/718; 503/36; 503/60; 503/64; 503/71; 503/164

(58) Field of Classification Search
USPC ................... 423/703, 328, 326, 333
See application file for complete search history.

(56) References Cited

U.S. PATENT DOCUMENTS

| | | | | |
|---|---|---|---|---|
| 3,702,886 A | * | 11/1972 | Argauer | 423/705 |
| 4,592,902 A | * | 6/1986 | Valyocsik | 423/706 |
| 6,299,854 B1 | * | 10/2001 | Henmi et al. | 423/700 |
| 6,596,909 B2 | * | 7/2003 | Nishijima et al. | 568/917 |
| 6,692,722 B2 | * | 2/2004 | Ando et al. | 423/700 |

FOREIGN PATENT DOCUMENTS

| | | | |
|---|---|---|---|
| JP | 06-182212 | * | 7/1994 |
| WO | WO 2004/058643 | | 7/2004 |

OTHER PUBLICATIONS

Synthesis and Characterization of the Zeolite ZSM-5. THe Research Foundation of SUNY, et al. 1989-1995.*
Synthesis and Characterization of the Zeolite ZSM-5. By the Research Foundation of Sunny et al (198901995).*

* cited by examiner

*Primary Examiner* — Melvin C Mayes
*Assistant Examiner* — Colette Nguyen
(74) *Attorney, Agent, or Firm* — Wood, Phillips, Katz, Clark & Mortimer

(57) ABSTRACT

A method of manufacturing a solid acid catalyst using industrial waste such as an insulator, optical fiber, and tip material is provided. The raw material contains a template agent, a compound having a formula of $R_{14}COR_{15}$, where $R_{14}$ and $R_{15}$ are alkyl groups, a silicon-containing inorganic compound, an aluminum-containing inorganic compound, and water with a weight ratio of $SiO_2/Al_2O_3$ of at least 1,000. The raw material is heat treated in a closed chamber (a first heat treatment), and heat treated in an atmosphere containing oxygen (a second heat treatment).

9 Claims, 3 Drawing Sheets

METHOD OF MANUFACTURING SOLID ACID CATALYST

BACKGROUND OF THE INVENTION

1. Field of the Invention

The present invention relates to a method of manufacturing a solid acid catalyst, and more specifically to a method of manufacturing a zeolite catalyst.

2. Description of the Related Art

Catalytic material may be used in various applications. One application is to decompose nitrogen oxide (NOx) into nitrogen and oxygen. The nitrogen oxide (NOx) generated in an internal-combustion engine is decomposed by the catalyst before exhaust gas containing the nitrogen oxide is discharged to the atmosphere.

A zeolite of ZSM-5 is well known as a highly efficient solid acid catalyst. ZSM-5 has a catalytic function to promote chemical reactions such as isomerization of hydrocarbons, alkylation of hydrocarbons, and catalytic cracking.

However, conventional ZSM-5 has several problems. For example, the raw material used to manufacture ZSM-5 is relatively expensive and the manufacturing process is complicated such that ZSM-5 becomes expensive and the application thereof is therefore generally limited to specific fields such as automotive applications.

In order to solve the above problems, one method of manufacturing a ZSM-5 solid acid catalyst has been developed, as disclosed in Patent Document JP, H06-182212, A.

JP, H06-182212, A discloses the use of coal ash as a raw material for a distinct reduction of material cost. However, the reaction time thereof is on the order of 36 hours long, resulting in low productivity and high energy costs for manufacturing.

The ZSM-5 catalyst obtained has grains of a very small diameter so that the number of effective pores is reduced. A filtration process for liquid-solid separation at the final step of manufacturing takes a relatively long time. When the ZSM-5 is fabricated into a honeycomb structure to be utilized in an actual vapor or liquid process, the binder degrades the performance of the catalyst.

The amount of industrial waste such as from insulators, optical fiber, silicon dioxide fine powder (white soot) produced by manufacturing of the optical fiber with the soot method, and tip material produced in the pulling process of the optical fiber, has been recently increasing. It is assumed that the amount of the industrial waste thereof will continue to increase. There is no existing practical processing method known and the cost of the current process is expensive.

SUMMARY OF THE INVENTION

In accordance with one feature of the invention, a method of manufacturing a solid acid catalyst having a grain of a large diameter by utilizing an industrial waste such as from insulators, optical fiber, silicon dioxide powder (white soot) produced by manufacturing of the optical fiber, with potentially high productivity and relatively low cost is provided.

According to a first aspect of the present invention, a method of manufacturing a solid acid catalyst includes the steps of: preparing a raw material containing at least one template agent selected from a compound having a formula of

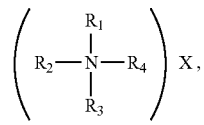

formula (1)

a combination A of a compound having a formula of

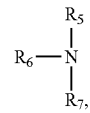

formula (2)

and a compound having a formula of $R_8X$, a combination B of a compound having a formula of $R_9NHR_{10}$ and a compound having a formula of $R_{11}X$, and a combination C of a compound having a formula of $NH_2R_{12}$ and a compound having a formula of $R_{13}X$, where $R_1$-$R_{13}$ are alkyl groups and X is a halogen atom or OH, a compound having a formula of $R_{14}COR_{15}$, where $R_{14}$ and $R_{15}$ are alkyl groups, a silicon-containing inorganic compound, an aluminum-containing inorganic compound, and water; adjusting the weight ratio of silicon dioxide to aluminum oxide in the raw material to be at least 1,000; heat treating the raw material in a chamber for forming an intermediate substance (a first heat treatment); and heat treating the intermediate substance in an atmosphere containing oxygen (a second heat treatment).

Preferably, the silicon-containing inorganic compound is an insulator.

Preferably, the silicon-containing inorganic compound is selected from at least one of a waste optical fiber, a waste powder of silicon dioxide produced at manufacturing of the optical fiber, and a waste silica glass.

Preferably, $R_1$-$R_4$ of formula (1) have the same alkyl group containing a carbon number of 2-5.

Preferably, $R_5$-$R_8$ of the combination A have the same alkyl group containing a carbon number of 2-5.

Preferably, $R_9$-$R_{11}$ of the combination B have the same alkyl group containing a carbon number of 2-5.

Preferably, $R_{12}$ and $R_{13}$ of the combination C have the same alkyl group containing a carbon number of 2-5.

Preferably, the silicon-containing inorganic compound is crushed into a grain having a diameter of 0.1 μm-0.1 mm.

Preferably, the aluminum-containing inorganic compound is crushed into a grain having a diameter of 0.1 μm-0.1 mm.

Preferably, the weight ratio of the template agent is 0.1-0.5 with respect to the weight of the silicon in the raw material.

DETAILED DESCRIPTION OF THE PREFERRED EMBODIMENTS

Figure 1:
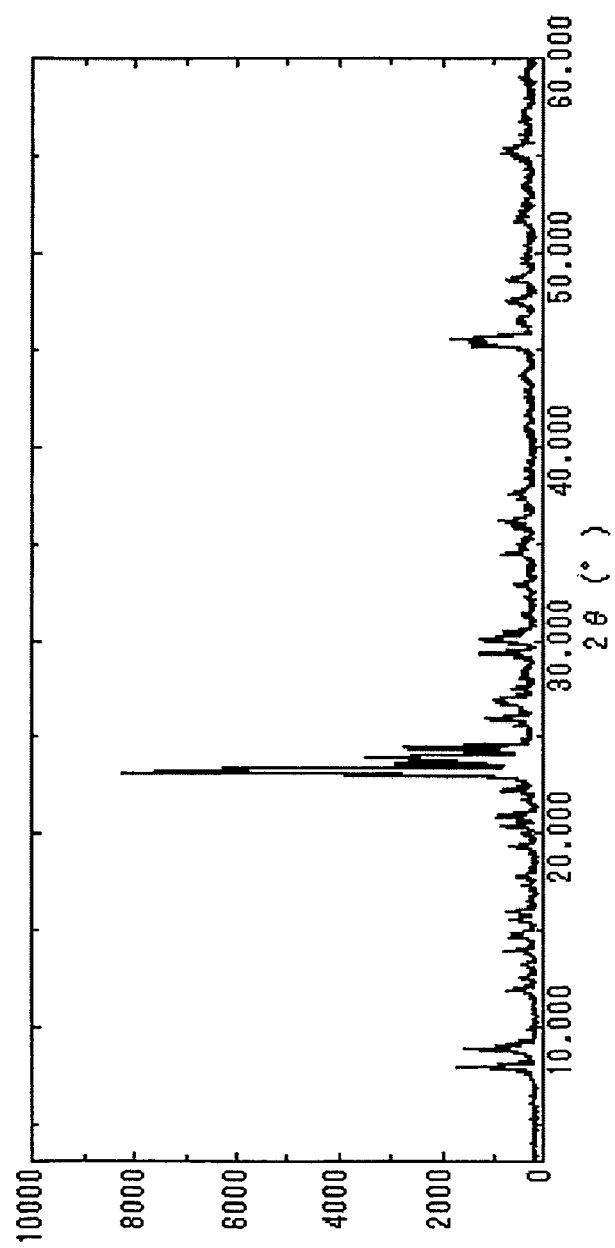
FIG. 1 is diffraction spectra of an intermediate substance after a first heat treatment, according to the invention.

A silicon-containing inorganic compound utilized in a method of the present invention is described utilizing industrial waste, such as that from an insulator, optical fiber, silicon dioxide fine powder (white soot) produced by manufacturing of the optical fiber, and tip material (waste silica glass) produced in the pulling process of the optical fiber.

The inorganic compound is crushed into a grain having a diameter of 0.1 μm-0.1 mm to obtain high formation reaction of a solid acid catalyst.

The optical fiber as a raw material is thin and easy to handle such that the optical fiber is cut out to be received into a pressure chamber. The optical fiber is occasionally coated with a protective resin. The protective resin, however, is very thin such that it is not necessary to remove the protective resin from the optical fiber.

When the insulator is used as the raw material and has a high aluminum content, the insulator is utilized for an aluminum-containing inorganic compound besides the silicon-containing inorganic compound. In this case, the insulator is utilized with other silicon-containing inorganic compounds such as the optical fiber, silicon dioxide fine powder, and tip material, which contain low aluminum content. The raw material is adjusted to have a weight ratio of $SiO_2/Al_2O_3$ of at least 1,000 with reduced weight of silicon and aluminum, respectively.

It is preferable to utilize the insulator of the industrial waste as the aluminum-containing inorganic compound. Coal ash, pulverized clay stone, pulverized china, pulverized porcelain, aluminum dross, and metal aluminum may also utilized for the raw material besides the insulator. These materials are also crushed into a grain having a diameter of 0.1 μ-0.1 mm to obtain high formation reaction of the solid acid catalyst.

It is necessary that the raw material utilized in the method of the present invention has a weight ratio of $SiO_2/Al_2O_3$ of at least 1,000 in order to achieve fast manufacturing and produce a large size of grain of the solid acid catalyst compared to the conventional method. More preferably, the weight ratio $SiO_2/Al_2O_3$ is at least 10,000.

A template agent of the raw material is essential to control the shape and size of pores of the solid acid catalyst. A structure of (≡Si—O—), which forms a main structure of the solid acid catalyst, covers the template agent as the shape and size of the template agent are important.

The template agent of the raw material of the present invention utilizes a combination of a quarternary ammonium salt and a compound having the same structure of the quarternary ammonium salt. The possible template agents area compound having a formula of

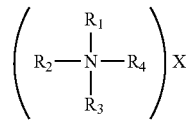

formula (1), a combination A of a compound having a formula of

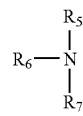

formula (2), and a compound having a formula of $R_8X$, a combination B of a compound having a formula of $R_9NHR_{10}$ and a compound having a formula of $R_{11}X$, and a combination C of a compound having a formula of $NH_2R_{12}$ and a compound having a formula of $R_{13}X$, where $R_1$-$R_{13}$ are alkyl groups and X is a halogen atom or OH.

Preferably, the combination of the quarternary ammonium salt and the compound having the same structure of the quarternary ammonium salt has a tetrahedron structure to avoid damage to the main structure of (≡Si—O—) of the solid acid catalyst. When the combination A is utilized for the template agent, $R_5$-$R_8$ have preferably the same alkyl group. The carbon number thereof is preferably 2-5 to enhance catalytic function of the solid acid catalyst.

When the combination B is utilized for the template agent, $R_9$-$R_{11}$ have preferably the same alkyl group. The carbon number thereof is preferably 2-5. A compounding ratio of the compound of formula (2) to the compound of $R_8X$ is preferably 1:2 or near that ratio. When the combination C is utilized for the template agent, $R_{12}$ and $R_{13}$ have preferably the same alkyl group. The carbon number thereof is preferably 2-5. A compounding ratio of the compound of $NH_2R_{12}$ to the compound of $R_{13}X$ is preferably 1:3 or near that ratio.

Any one of the above templates (one combination) can be utilized or a combination containing at least two of the template agents can also be utilized. The weight ratio of the template agent is adjusted to 0.1-0.5 with respect to the weight of silicon in the raw material. When the weight ratio is less than 0.1, the reaction rate decreases and results in low productivity. When the weight ratio is more than 0.5, a reaction among the organic compounds, or side reaction, occurs and decreases the effect of the template agent or prevents the reaction of the solid acid catalyst. Preferably, the weight ratio of the template agent is 0.15-0.45.

The method of manufacturing the solid acid catalyst of the present invention includes blending of a compound having a formula of $R_{14}COR_{15}$, where $R_{14}$ and $R_{15}$ are alkyl group, or ketone. In one embodiment, $R_{14}$ and $R_{15}$ can be the same and have a carbon number of 2-10. One example of a suitable ketone is diethyl ketone. The raw material contains the ketone with a weight ratio of 0.01-5 with respect to the weight of silicon content. When the weight ratio of the ketone to the silicon content is less than 0.01, the reaction rate decreases and results in low productivity. When the weight ratio is more than 5, a reaction between the organic compounds, or side reaction, occurs and wastes the raw material or prevents the reaction of the solid acid catalyst.

The method of the present invention also includes blending water with the raw material. The water is present in a weight ratio of 2-50 with respect to the weight 1 of the silicon content in the raw material. When the weight ratio is less than 2, it becomes hard to turn the intermediate substance into a slurry and assist the reaction. When the ratio is more than 50, the concentration of the slurry becomes too low resulting in low reaction rate.

The raw material also contains sodium hydroxide. The sodium hydroxide extracts the silicon component from the silicon-containing inorganic compound of the raw material to form the main structure of (≡Si—O—). The sodium hydroxide is contained with a weight ratio of 0.01-1 with respect to the weight 1 of the silicon content in the raw material. When the ratio is less than 0.01, the reaction rate decreases and is not practical. When the ratio is more than 1, the desired product is not attained resulting in low productivity. Preferably, the ratio is 0.02-0.5.

The sodium chloride is present in a weight ratio of 0.005-2 with respect to the weight 1 of the silicon content in the raw material. When the ratio is less than 0.005, the reaction rate decreases and is not practical. When the ratio is more than 2, the desired product is not attained resulting in low productivity. Preferably, the ratio is 0.05-0.5.

The raw material is placed in a closed chamber (reaction chamber) and subjected to a heat treatment (a first heat treatment) for forming the main structure of (≡Si—O—) in the solid acid catalyst. A temperature of the first heat treatment is preferably 100-250° C. When the temperature is lower than 100° C., a period of time of the heat treatment becomes longer and not practical. When the temperature is higher than 250° C., manufacturing costs become high. Preferably, the temperature of the heat treatment is 140-180° C.

The reaction time is preliminarily determined. For example, at 140° C., the reaction time is usually 10-20 hours. The reaction time generally becomes longer and shorter as the temperature of the heat treatment becomes lower and higher, respectively.

After the first heat treatment, usually after cooling, the intermediate substance is removed from the reaction chamber, and water and alcohol are added to the intermediate substance for washing the intermediate substance. Then, the intermediate substance is dried and is subjected to a second heat treatment in an atmosphere containing oxygen.

The second heat treatment removes the template agent from the main body structure containing mainly the structure of (≡Si—O—) formed at the first heat treatment. The template agent is oxidized with oxygen in the atmosphere, for example oxygen gas in air, and removed with oxidization. The second heat treatment is carried out at a temperature of at least 500° C., though the main structure of (≡Si—O—) has heat resistance. The solid acid catalyst is manufactured through the oxidation process.

EXAMPLE

Example 1

A fine powder of silicon dioxide (white soot) produced during manufacturing of an optical fiber is utilized as a raw material and has a weight ratio $SiO_2/Al_2O_3$ of 10,000. Tetrapropylammonium bromide is utilized for a template agent.

7 kg of the silicon dioxide powder, 3 kg of tetra-propylammonium bromide, 0.5 kg of sodium hydroxide, and 89.4 kg of water are dissolved together to form an alkaline solution. The alkaline solution is charged into a pressure (reaction) chamber and kept at a temperature of 110° C. for 80 hours (a first heat treatment). The internal pressure of the chamber is 0.04 Mpa higher than atmosphere.

After the first heat treatment, the alkaline solution is filtered and dried to obtain an intermediate substance. The template agent is still present inside the intermediate substance. FIG. 1 shows diffraction spectra of the intermediate substance.

The intermediate substance is then heat treated at a temperature of 550° C. for 10 minutes in air (a second heat treatment) and 4.9 kg of a solid acid catalyst is obtained. A diameter of the grains measured is 1-3.5 μm with a mean diameter of 1.74 μm.

Figure 2:
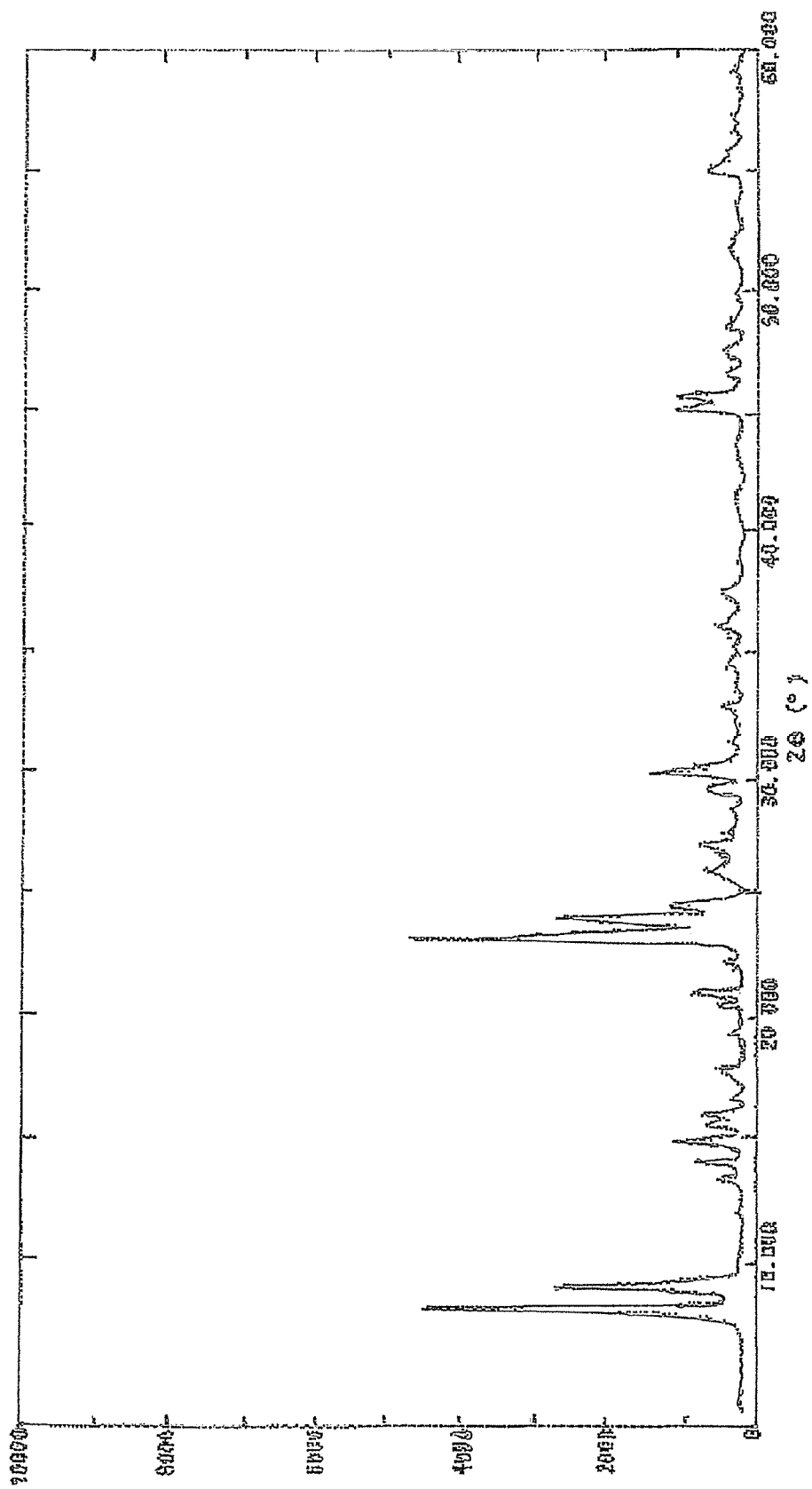
FIG. 2 is diffraction spectra of a solid acid catalyst after a second heat treatment according to the invention.

The solid acid catalyst is analyzed with X-ray diffraction analysis. FIG. 2 shows diffraction spectra of a solid acid catalyst after a second heat treatment, according to the invention, and FIG. 3 shows diffraction spectra of a commercial ZSM-5.

Figure 3:
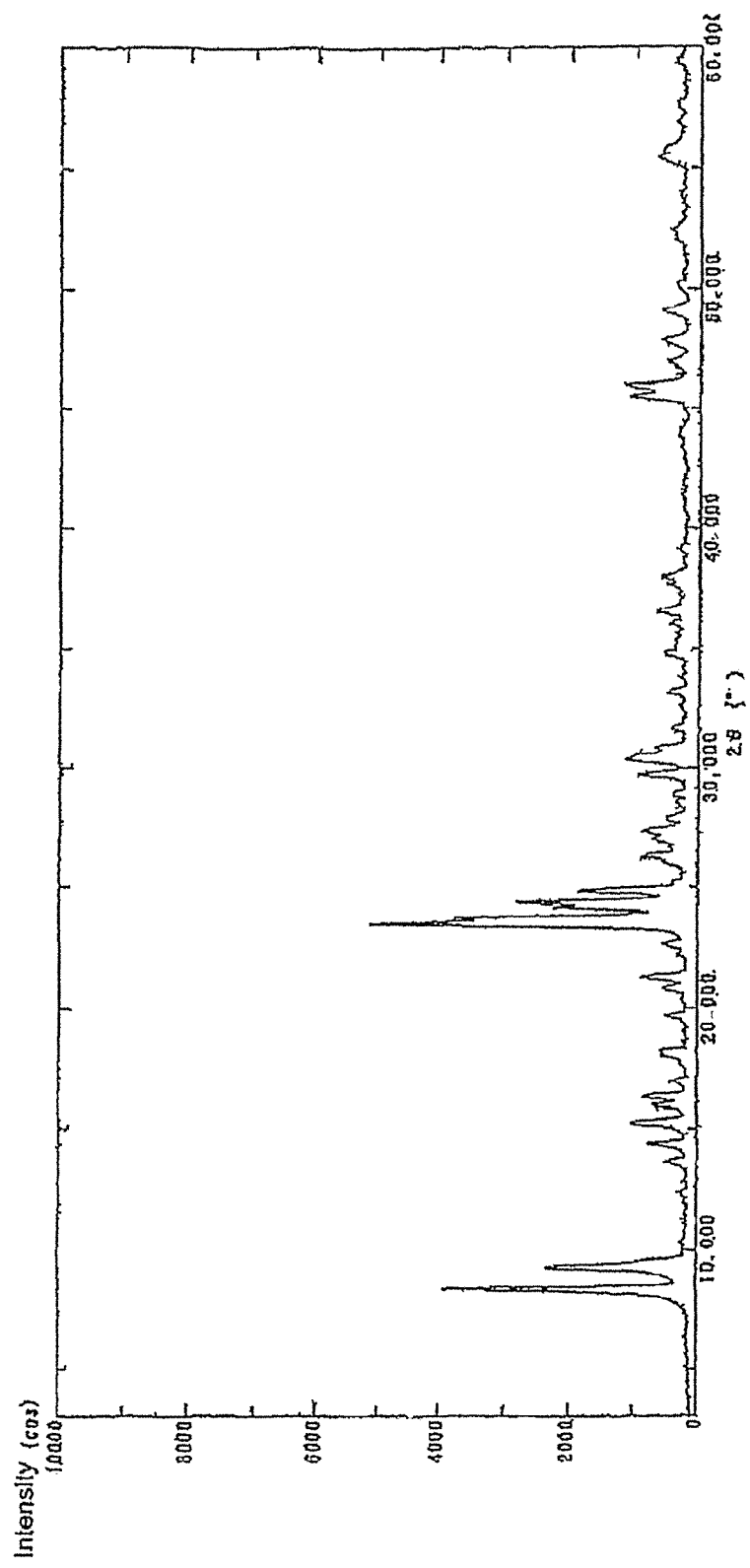
FIG. 3 is a diffraction spectra of a commercial ZSM-5.

Comparing FIG. 2 and FIG. 3, the spectra of the solid acid catalyst of the present invention almost coincide with the spectra of the commercial ZSM-5. Accordingly, the method of the present invention provides the manufacturing of a zeolite of ZSM-5 type known as a high performance solid acid catalyst.

Example 2

The first heat treatment used in Example 1 is changed from 110° C. for 80 hours, to 150° C. for 8 hours. The internal pressure of the chamber is 0.37 MPa higher than atmosphere. 5.2 kg of the solid acid catalyst is obtained. A diameter of the grains measured is 4.5-11.0 μm with a mean diameter of 6.64 μm. The X-ray spectra confirm that the solid acid catalyst is a zeolite of ZSM-5 type.

Example 3

The first heat treatment used in Example 1 is changed from 110° C. for 80 hours, to 180° C. for 1 hour. The internal pressure of the chamber is 0.90 MPa higher than atmosphere. 6.45 kg of the solid acid catalyst is obtained. A diameter of the grains measured is 7.5-12.0 μm with a mean diameter of 9.95 μm. The X-ray spectra confirm that the solid acid catalyst is a zeolite of ZSM-5 type.

From the above Examples, as the temperature of the first heat treatment increases in a range of 110-180° C., the reaction time decreases and the diameter of the grains of the solid acid catalyst becomes larger and a yield of the solid acid catalyst increases.

According to the method of the present invention, the industrial waste such as from the manufacture of insulators, optical fiber, fine powder of silicon dioxide (white soot) produced at the manufacturing of the optical fiber, and tip material (silica glass) produced at the pulling process of the optical fiber can be utilized as the raw material for manufacturing the solid acid catalyst with good productivity and low cost. The solid acid catalyst has large diameter grains and provides a high-performance catalyst. The solid acid catalyst of the present invention can be applied to not only the field of decomposition of NOx but also other fields requiring low price of solid acid catalyst.

What is claimed is:

1. A method of manufacturing a solid acid catalyst comprising the steps of:
   preparing a raw material containing:
   a) tetrapropylammonium bromide as a template agent,
   b) ketone having a formula of $R_{14}COR_{15}$, where $R_{14}$ and $R_{15}$ are alkyl groups, and CO is carbonyl group,
   c) a silicon-containing inorganic compound selected from at least one of a waste optical fiber, a waste powder of silicon dioxide produced in manufacturing of the optical fiber, and a waste silica glass,
   d) an aluminum-containing inorganic compound,
   e) water, wherein the weight ratio of water is between 2 and 50 with respect to the weight of the silicon in the raw material, and
   f) sodium hydroxide, wherein the weight ratio of sodium hydroxide is between 0.01 and 1 with respect to the weight of the silicon in the raw material;
   adjusting the weight ratio of silicon dioxide to aluminum oxide in the raw material to be at least 1,000;
   heat treating the raw material at a temperature of between 100-250 degrees C. in a closed chamber to form an intermediate substance and
   heat treating the intermediate substance at a temperature of at least 500 degrees C. in an atmosphere containing oxygen to thereby produce a solid acid catalyst of particles having diameters between 1 and 12 μm that produces an X-ray diffraction pattern of a ZSM-5 type zeolite,
   wherein the weight ratio of the ketone is 0.01-5 with respect to the weight of the silicon in the raw material.

2. A method of manufacturing a solid acid catalyst comprising the steps of:
preparing a raw material containing:
a) tetrapropylammonium bromide as a template agent,
b) ketone having a formula of $R_{14}COR_{15}$, where $R_{14}$ and $R_{15}$ are alkyl groups, and CO is carbonyl group,
c) a silicon-containing inorganic compound selected from at least one of a waste optical fiber, a waste powder of silicon dioxide produced in manufacturing of the optical fiber, and a waste silica glass,
d) an aluminum-containing inorganic compound,
e) water, wherein the weight ratio of water is between 2 and 50 with respect to the weight of the silicon in the raw material, and
f) sodium hydroxide, wherein the weight ratio of sodium hydroxide is between 0.01 and 1 with respect to the weight of the silicon in the raw material;
adjusting the weight ratio of silicon dioxide to aluminum oxide in the raw material to be at least 1,000;
heat treating the raw material at a temperature of between 140 to 180 degrees C. in a closed chamber to form an intermediate substance and
heat treating the intermediate substance at a temperature of at least 500 degrees C. in an atmosphere containing oxygen to thereby produce a solid acid catalyst of particles having diameters between 1 and 12 μm that produces an X-ray diffraction pattern of a ZSM-5 type zeolite, wherein the weight ratio of the ketone is 0.01-5 with respect to the weight of the silicon in the raw material.

3. The method of claim 2 wherein said silicon-containing inorganic compound is an insulator.

4. The method of claim 2 wherein the silicon-containing inorganic compound is crushed into a grain having a diameter of 0.1 μm-0.1 mm.

5. The method of claim 2 wherein the aluminum-containing inorganic compound is crushed into a grain having a diameter of 0.1 μm-0.1 mm.

6. The method of claim 2 wherein the weight ratio of the template agent is 0.1-0.5 with respect to the weight of the silicon in the raw material.

7. The method of claim 2, wherein the reaction time of the step of heat treating the raw material at a temperature of between 140 to 180 degrees C. is between 1 and 20 hours.

8. The method of claim 2 further comprising the step of cooling the intermediate substance before heat treating the intermediate substance at a temperature of at least 500 degrees C.

9. The method of claim 2 further comprising the step of washing the intermediate substance with water and alcohol before heat treating the intermediate substance to a temperature of at least 500 degrees C.

* * * * *